United States Patent [19]
Kammer

[11] 3,859,029
[45] Jan. 7, 1975

[54] SNOW MOLDING APPARATUS

[76] Inventor: Steven Joseph Kammer, 80-19 Myrtle Ave., Glendale, N.Y. 11227

[22] Filed: Jan. 7, 1974

[21] Appl. No.: 431,069

[52] U.S. Cl. .................. 425/441, 425/444, 249/74, 425/DIG. 57
[51] Int. Cl. .................. B29c 1/00, B29c 7/100
[58] Field of Search .......... 425/441, 442, 443, 444, 425/DIG. 57, 436; 249/66, 67, 68, 74, 75, 121

[56] References Cited
UNITED STATES PATENTS

| | | | |
|---|---|---|---|
| 982,044 | 1/1911 | Felger | 249/121 |
| 1,020,004 | 3/1912 | Wishman | 249/121 X |
| 1,830,227 | 11/1931 | Eppensteiner | 249/75 |
| 2,752,631 | 7/1956 | Wendt | 425/DIG. 57 |
| 3,685,936 | 8/1972 | Meth et al. | 425/DIG. 57 |
| 3,741,706 | 6/1973 | Conley et al. | 425/DIG. 57 |

*Primary Examiner*—J. Howard Flint, Jr.
*Attorney, Agent, or Firm*—Philip D. Amins

[57] ABSTRACT

A snow molding apparatus is provided that includes an ejecting means for automatically ejecting the molded material when opening the mold in preparation for adding additional molding material. The housing and frame of the molding apparatus preferably is fabricated in an animated reproduction of an animal, bird fish, person or object.

9 Claims, 8 Drawing Figures

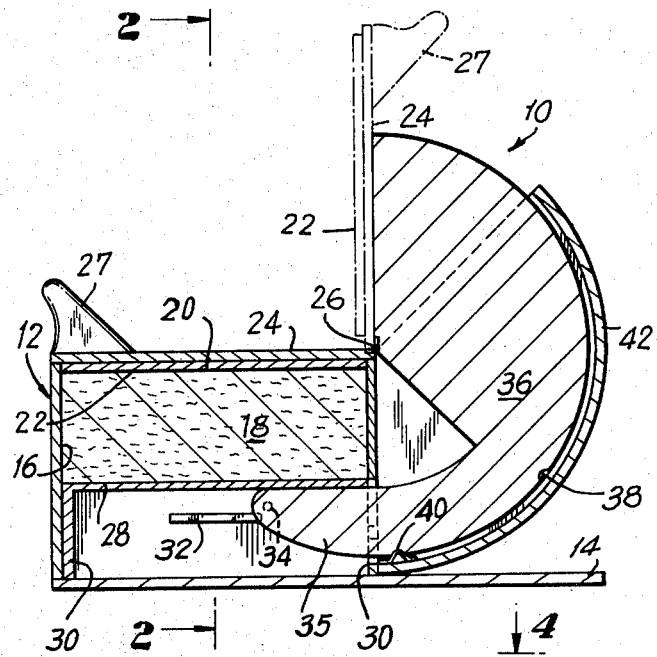
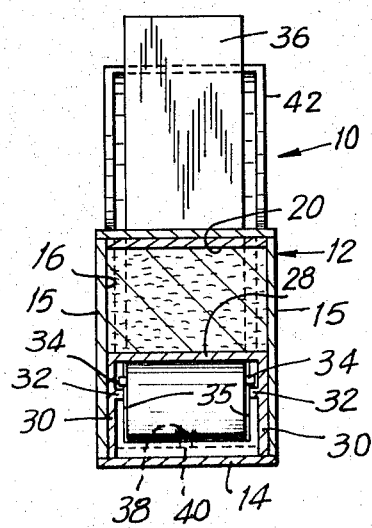
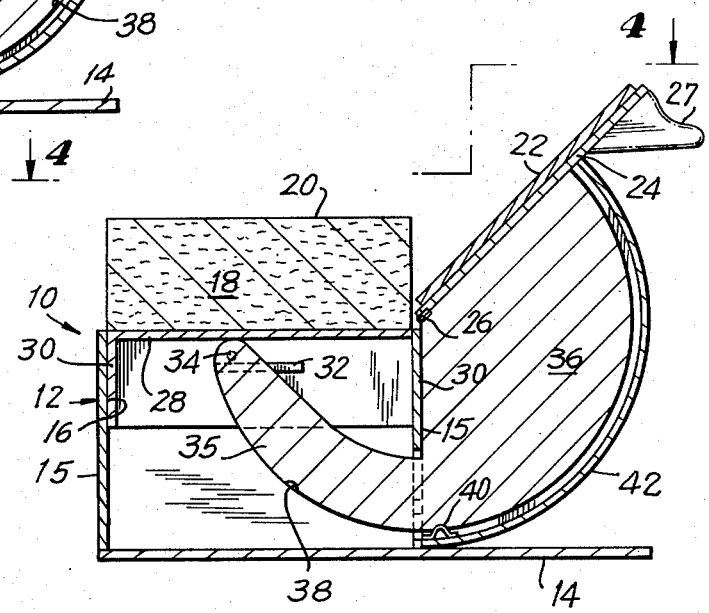
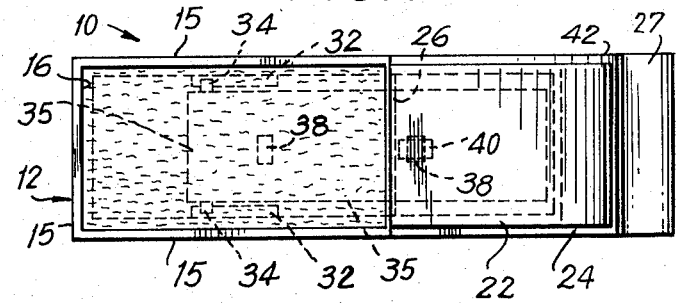

SNOW MOLDING APPARATUS

BACKGROUND OF THE INVENTION

The present invention relates to molding apparatus and, in particular, to a snow molding apparatus, which includes an automatic ejection means for use by small children.

Various molding apparatus have been constructed to mold articles resembling animals, soldiers, Indians, cowboys and the like from pliable molding materials, all of which are adapted to entertain children that have been confined to the house. The present invention provides a simple, inexpensive and easily operable molding apparatus or toy for use by children outdoors in the snow. The toy is preferably designed so that it may be used to mold building bricks for building snow walls, snow forts or the like, or alternatively, snowballs for children to engage in snowball throwing activities. The molding apparatus is designed to have an automatic ejecting means for ejecting the molded material as well as having a pleasing and attractive physical appearance in the form of an animated replica of the child's favorite animal or cartoon character.

SUMMARY OF THE INVENTION

Accordingly, it is an object of the present invention to provide a novel, simply operated molding apparatus which is adapted to mold bricks or spheres.

Another object of the present invention is to provide a novel molding apparatus which may be used to mold snow and has an attractive physical appearance.

A molding apparatus, according to the principles of the present invention, comprises a molding frame including a lower portion of a mold cavity, the mold cavity being adapted to mold a moldable material into the shape of the mold cavity under influence of pressure applied to the top surface of the material, pressure means pivotably connected to a top edge of the molding frame, the pressure means including a mating coacting portion of the mold, and being adapted for movement toward and away from one another for applying pressure to the top surface of the molding material, and ejecting means cooperating with the lower portion of the mold cavity and being movably mounted therein for ejecting said molding material from said mold cavity, and activating means operably connected to the pressure means and the ejecting means, the activating means being adapted to cause the ejecting means to eject the moldable material when the pressure means is moved away from the lower mold cavity and retracting the ejecting means when the pressure means is moved toward the lower mold cavity portion.

These together with other objects and advantages which will become apparent reside in the details, construction and operation, as more fully described and claimed hereinafter, reference being had to the accompanying drawing forming a part hereof, wherein like numerals refer to like parts throughout.

BRIEF DESCRIPTION OF THE DRAWING

FIG. 1 is a cross-sectional side view, in elevation, of a brick-molding apparatus in an open position for inserting molding material therein, according to the principles of the present invention;

FIG. 2 is a cross-sectional view, in elevation, taken generally along the line 2—2 of FIG. 1;

FIG. 3 is a cross-sectional view, in elevation, with the brick molding apparatus fully opened and ejecting the molded material;

FIG. 4 is a top view of brick molding apparatus along lines 4—4 shown in FIG. 3;

DESCRIPTION OF THE PREFERRED EMBODIMENT

Figure 5:
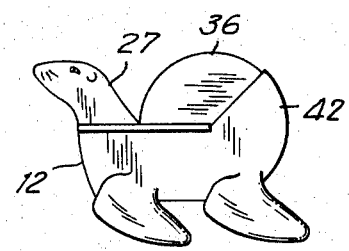
FIGS. 5 and 6 are pictorial representations showing the outer frame and housing of the molding apparatus in the animated form of a seal and head of a pelican, respectively.

Referring now to the figures and, in particular to FIGS. 1 through 4, there is shown a brick molding apparatus 10, which includes a frame 12. The frame 12 is provided with a base 14 which functions to stabilize the brick molding apparatus 10 when in use. The frame 12 also is provided with walls 15, which are formed to yield a rectangularly shaped cavity 16 in the shape of a conventional brick. A brick may be obtained from the mold cavity 16 when a moldable material 18 such as snow, clay, etc., or the like is placed in the cavity 16 and pressure applied to the surface 20 thereof. Pressure may be applied to the surface 20 of the moldable material 18 by a pressure means or packer 22 which is affixed to the top edge of cover plate 24 of the mold cavity 16 by a conventional hinge 26. The pressure means 22 may include a handle 27, which may be weighted and functions to hold the cover plate 24 open while the cavity 16 is filled.

The bottom plate 28 of the mold cavity 16 functions as the ejecting means and is movably mounted within the frame 12. The bottom plate 28 is provided with legs 30 which position the bottom plate 28 below the hinge 26 and surface 20 the moldable material to set the height of brick 18. The legs 30 are provided with a pair of longitudinal bars 32 which are adapted to cooperate with coacting protrusions 34 provided on the extending portion 35 of the automatic activating means 36.

The automatic activating means 36 is generally arcuate in shape and is affixed to the top cover plate 24 for movement therewith and, therefore, is also rotatable about hinge 26. The extending portion 35 of the activating means 36 is provided with notches 38 which are adapted to cooperate with detent springs 40 provided in a housing 42.

Housing 42 is generally arcuate in shape and formed to encase the activating means 36. The housing 42 extends from the base plate 14 to a position which limits the downward movement of the top cover plate 24 to provide a maximum open position which is the automatic eject position. The detent 40 coacting with notch 38 provides a cavity open position which is used when filling the cavity 16 with moldable material 18.

Figure 6:
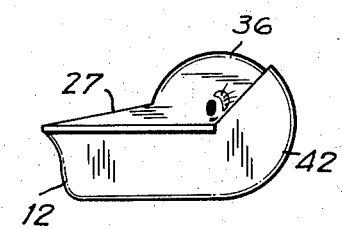

The frame 12, housing 42, activating means 36 and handle 27 may be fabricated to form animated replicas of animals, birds, fish, persons, objects, etc., an example of which is shown in FIG. 5 wherein an animated replica of a seal is shown, or in FIG. 6 wherein an animated replica of the head of a pelican is shown.

Figure 7:
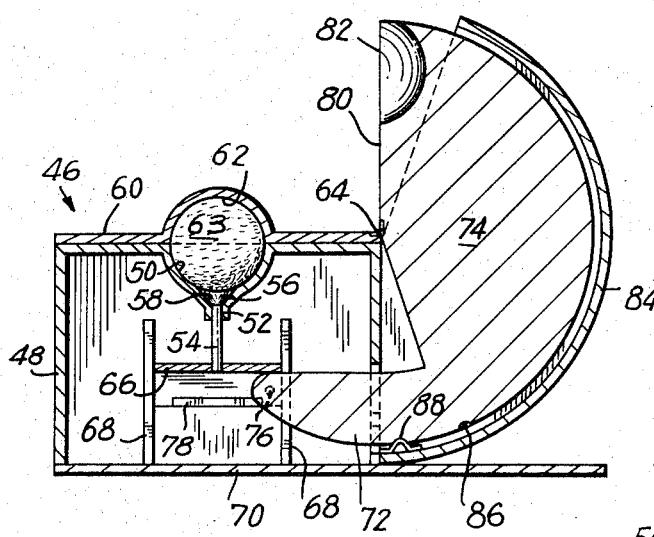
FIG. 7 is a cross-sectional view, in elevation, of a snowball molding apparatus with the cavity mold open to receive molding material, according to the principles of the present invention.
Figure 8:
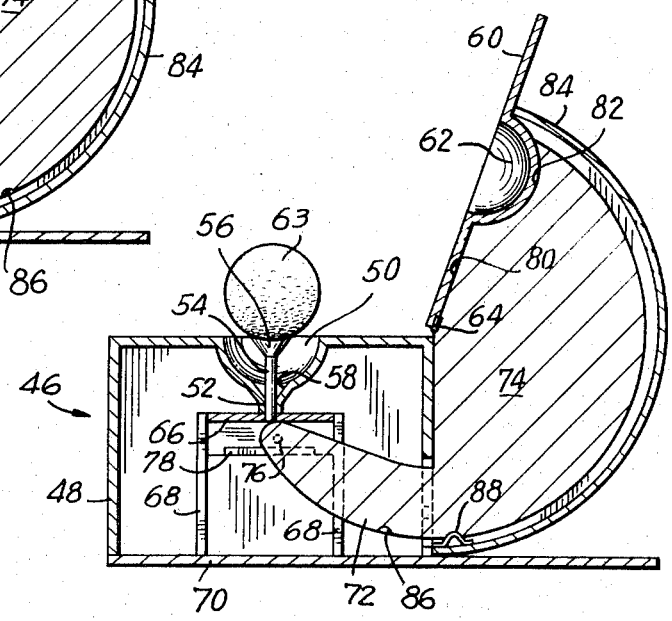
FIG. 8 is a cross-sectional view in elevation of the snowball molding apparatus fully opened and ejecting the molded material.

An alternative embodiment of the present invention is shown in FIGS. 7 and 8 wherein, a sphere molding apparatus 46 is shown. Preferably, the sphere molding apparatus 46 is used by children for molding snowballs. The frame 48 of the sphere molding apparatus 46 is provided with a hemispherically shaped lower mold cavity 50. The lower mold cavity 50 is provided with a centrally located opening 52 through which a rod 54 is slidable mounted. One end of rod 54 is provided with a cup shaped portion 56 adapted to fit into a recess 58 provided in the lower cavity 50 so that the hemispherical shape of cavity 50 is intact.

The pressure means or cover 60 is provided with a hemispherically shaped cavity 62 which is pivotally affixed to the frame 48 by a hinge 64. Upper cavity 62 is adapted to coact with lower cavity 50 to form a sphere 63. When the lower cavity 50 is overfilled with snow and compacted by upper cavity 62, it forms a sphere or snowball 63.

The other end of rod 54 is affixed to a plate 66 which is slidably mounted within guide rails 68 which are affixed to base 70. Plate 66 and guide rails 68 in combination with rod 54 and cup portion 56 function as an automatic ejection plunger which will be explained hereinafter.

The extending portions 72 of activating means 74 is provided with protrusions 76, which are adapted to cooperate with longitudinal bars 78 thereby urging plate 66 in an upwardly direction when the extending portion 72 of activating means 74 is urged in an upwardly direction by cover 60 being fully opened to contact and apply pressure to edge 80 of activating means 74. Edge 80 may also be provided with a hemispherically shaped cavity 82 and when urged rearwardly, is stopped in the maximum open position by housing 84, which encloses the activating means 74 and automatically ejects sphere 63 in the same manner as described hereinbefore in conjunction with the brick making apparatus. The activating means 74 is also provided with a notch 86, which is adapted to cooperate with detent spring 88 to maintain the activating means 74 in an open position to enable the mold cavities 50 and 62 to receive snow or the like.

In operation, the brick molding apparatus 10 and the sphere molding apparatus 46 function in a like manner. The cavity is opened to the detent position on the activating means 36, 74 and the mold cavity 16, 50 is filled with a moldable material. The cover plate 24, 60 is closed compacting the moldable material by exerting pressure on the top surface of the material. The mold cavity is opened to its maximum position thereby automatically ejecting the molded material. The activating means 36, 74 urges the ejecting means 28, 56 upwardly to force the molded material from the cavity 16, 50. Once the molded material has been removed from the mold the cover plate 24, 60 is returned to the detent position and the mold cavity may be refilled and the process repeated.

It will be understood that various changes in the details, materials, arrangements of parts and operating conditions, which have been herein described and illustrated in order to explain the nature of the invention may be made by those skilled in the art within the principles and scope of the invention.

Hereinbefore, has been disclosed, a molding apparatus, which automatically ejects the molded material from the mold, is simple and easily useable by children and is attractive in physical appearance. The molding apparatus is relatively inexpensive to manufacture, since all the parts may be fabricated from conventional plastic materials. The external animated appearance of the molding apparatus will delight and entertain young children.

What is claimed is:

1. A molding apparatus comprising:
a molding frame including a lower portion of a mold cavity, said mold cavity being adapted to mold a moldable material into the shape of said mold cavity under the influence of pressure applied to the top surface of said material;
pressure means pivotally connected to a top edge of said molding frame, said pressure means including a mating coacting upper portion of said mold for movement toward and away from one another for applying pressure to said top surface of said molding material;
ejecting means cooperating with the lower portion of said mold cavity and being movably mounted therein for ejecting said molding material from said mold cavity; and
activating means operably connected to said pressure means and said ejecting means for causing said ejecting means to eject said moldable material when said pressure means is moved away from said lower mold cavity and retract said ejecting means when said pressure means is moved toward said lower mold cavity portion.

2. A molding apparatus according to claim 1, wherein said lower mold cavity is generally rectangular in shape and said ejecting means is the bottom plate of said lower mold cavity portion.

3. A molding apparatus according to claim 1, wherein said pressure means comprises the top cover plate of said mold cavity.

4. A molding apparatus according to claim 1, wherein said lower and upper mating and coacting cavity portions are hemispheres.

5. A molding apparatus according to claim 1, wherein said molding apparatus is formulated of a plastic material and is adapted to mold snow.

6. A molding apparatus according to claim 1, wherein said frame includes a base plate and a generally hemispherically shaped housing enclosing said activating means.

7. A molding apparatus according to claim 6, wherein said frame and housing are fabricated to form an animated replica of a predetermined physical representation such as an animal, bird, fish, person or object.

8. A molding apparatus according to claim 7, wherein said frame and housing are fabricated to form an animated replica of the head of said predetermined physical representation, and said cavity opening is the mouth thereof.

9. A molding apparatus according to claim 1, wherein said activating means includes detent means for maintaining the mold in an open position.

* * * * *